Patented July 3, 1923.

UNITED STATES PATENT OFFICE.

ROBERT R. WILLIAMS, OF CHICAGO, ILLINOIS, AND DONALD H. WHITE, OF BERLIN, NEW HAMPSHIRE, ASSIGNORS, BY MESNE ASSIGNMENTS, TO SETH B. HUNT, TRUSTEE, OF MOUNT KISCO, NEW YORK.

PROCESS FOR THE MANUFACTURE OF KETONES.

No Drawing.   Application filed April 3, 1919.   Serial No. 287,285.

*To all whom it may concern:*

Be it known that we, ROBERT R. WILLIAMS and DONALD H. WHITE, citizens of the United States of America, residing in the city of Chicago, county of Cook, State of Illinois, and in the city of Berlin, county of Coos, State of New Hampshire, respectively, have invented a certain new and useful Improvement in Processes for the Manufacture of Ketones, of which the following is the specification.

Our invention relates to a process for the manufacture of ketones from corresponding secondary alcohols, and the use of a particular zinc alloy catalyst.

Our invention consists in passing the vapors of secondary alcohols, either with or without admixtures of air or other oxygen-containing gas, over heated brass, at temperatures ranging from 500° C. to 800° C., whereby the secondary alcohols are partially converted into the corresponding ketones. The term "brass" includes all alloys involving the use of zinc, copper, or these and additional materials. The present invention provides specifically for the use of zinc as a catalyst and makes it possible to use zinc where heretofore it has not been practically possible. We have found that from a chemical standpoint zinc is the best catalyst for the reaction and that copper is next in importance. The use of zinc, alone, is inadvisable from a practical standpoint because it melts at the temperature of the reaction, thus resulting in loss of contact surface and failure of the operation. This peculiarity of zinc is overcome if copper and zinc are alloyed in suitable proportions, preferably with about 50 per cent of each, this ratio being subject to wide variation. The resultant alloy is a catalytic metal which does not fuse at the temperature of the reaction and which partakes of the chemical advantage of pure zinc. The presence or addition of small amounts of other metals to the copper zinc alloy does not materially affect the result and would fall within the scope of the invention.

To illustrate the practical operation of our process the preferred procedure is described as follows: Secondary alcohols, or mixtures thereof, which may contain as much as 25 per cent of water, are vaporized in a closed vessel and the vapors arising are mixed with from two to three times their volume of air and passed through a reaction chamber maintained at a temperature of 500° C. to 800° C. The oxygen of the air combines with the liberated hydrogen in the reaction chamber and the heat of this combustion serves to maintain the desired temperature. In this chamber, which is constructed of brass, the vapors are forced into intimate contact either with the walls of said chamber or with brass turnings or other form of brass having a large surface exposure, the said brass turnings being contained within the reaction chamber. The vapors, after passing through the reaction chamber, are condensed, recovered, and purified by well known methods.

In the case of certain unstable higher alcohols, especially those which are expensive, it is desirable to admit the alcohol vapors to the reaction chamber without admixture with air. In this case the reaction chamber must be maintained at the proper temperature by the application of a convenient form of external heat. The exclusion of air in such cases results in an economy of alcohols, though at the sacrifice of convenience of operation. Except for the necessity of supplying external heat, no substantial modification of procedure is required.

Having thus described our invention, we claim:—

1. A process for the manufacture of ketones, which process consists in subjecting vapors of secondary alcohols to the action of brass heated to temperatures ranging from 500° C. to 800° C.

2. A process for the manufacture of ketones, which process consists in subjecting vapors of secondary alcohols mixed with air to the action of brass at temperatures ranging from 500° C. to 800° C.

3. A process for the manufacture of ketones, which process consists in contacting vapors of secondary alcohols mixed with an oxygen-containing gas mixture of brass at temperatures ranging from 500° C. to 800° C.

4. A process for the manufacture of ketones, which process consists in contacting vapors of secondary alcohols with a catalyst containing copper and zinc at temperatures ranging from 500° C. to 800° C.

5. A process for the manufacture of ketones, which consists in contacting vapors of secondary alcohols with a catalyst comprising zinc at temperatures ranging from 500 degrees C. to 800 degrees C.

6. The process of converting secondary alcohols to ketones; which consists in bringing vapors of the alcohols admixed with gas containing oxygen into extensive contact with a heated catalyst, at a temperature of from 500 degrees to 800 degrees C.

7. The process of converting isopropyl alcohol containing up to about 25 per cent of water into ketones, which consists in vaporizing the alcohol-water mixture and contacting the vapors admixed with air with a catalyst of base metal, at a temperature of about 500 degrees C. to 800 degrees C.

In testimony whereof, we affix our signatures.

ROBERT R. WILLIAMS.
DONALD H. WHITE.